United States Patent
Termine et al.

(10) Patent No.: US 8,540,022 B1
(45) Date of Patent: *Sep. 24, 2013

(54) METHOD OF DELIVERING FRAC FLUID AND ADDITIVES

(71) Applicant: Tetra Technologies, Inc., The Woodlands, TX (US)

(72) Inventors: Enrico J. Termine, The Woodlands, TX (US); Robert I. Richie, Conroe, TX (US)

(73) Assignee: Tetra Technologies, Inc., The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/685,940

(22) Filed: Nov. 27, 2012

Related U.S. Application Data

(63) Continuation of application No. 13/453,210, filed on Apr. 23, 2012, now Pat. No. 8,316,935, which is a continuation of application No. 12/555,401, filed on Sep. 8, 2009, now Pat. No. 8,162,048.

(60) Provisional application No. 61/191,528, filed on Sep. 9, 2008.

(51) Int. Cl.
*E21B 43/26* (2006.01)

(52) U.S. Cl.
USPC ............... 166/250.01; 166/53; 166/308.1; 166/308.3

(58) Field of Classification Search
None
See application file for complete search history.

(56) References Cited

U.S. PATENT DOCUMENTS

| | | | |
|---|---|---|---|
| 2,664,954 A | 1/1954 | Johnson |
| 3,077,930 A | 2/1963 | Beckett |
| 3,722,595 A | 3/1973 | Kiel |
| 4,502,959 A | 3/1985 | Hansen |

(Continued)

FOREIGN PATENT DOCUMENTS

| | | |
|---|---|---|
| EP | 0363316 B1 | 12/1992 |
| EP | 0337624 B1 | 10/1993 |

(Continued)

OTHER PUBLICATIONS

Dezhi, Sun; Guangmeng, Ren; Jongshik, Chunk; "Advanced Treatment of Oil Recovery Wastewater from 1 Polymer Flooding by UV/H20/03 and Fine Filtration;" vol. 18, No. 1; Journal of Environmental Sciences; 2006; School of Municipal and Environmental Engineering, Harbin Institute of Technology; Science Press; Beijing, China.

(Continued)

*Primary Examiner* — George Suchfield
(74) *Attorney, Agent, or Firm* — Garvey, Smith, Nehrbass & North, L.L.C.; Brett A. North

(57) ABSTRACT

A method for the controlled delivery of a fracturing fluid to a well bore comprises formulating an aqueous base fluid such that it meets or exhibits desired physical and chemical characteristics for an optimal fracturing fluid. The formulation of the aqueous base fluid max involve commingling one or more sources of waste water with a source of fresh water followed by controlled injection of one or more additives. This process is substantially completed prior to delivering the aqueous base fluid to the well site. This allows the delivery of an optimal volume of the aqueous base fluid with homogeneously blended additives to the well bore.

17 Claims, 6 Drawing Sheets

(56) References Cited

U.S. PATENT DOCUMENTS

| | | | |
|---|---|---|---|
| 4,507,212 | A | 3/1985 | Dria et al. |
| 4,538,221 | A | 8/1985 | Crain et al. |
| 4,538,222 | A | 8/1985 | Crain et al. |
| 4,552,591 | A | 11/1985 | Millar |
| 4,848,981 | A | 7/1989 | Kasprzak |
| 4,895,665 | A | 1/1990 | Colelli et al. |
| 4,901,563 | A | 2/1990 | Pearson |
| 5,301,751 | A | 4/1994 | Githens et al. |
| 5,877,127 | A | 3/1999 | Card et al. |
| 5,964,295 | A | 10/1999 | Brown et al. |
| 6,007,227 | A | 12/1999 | Carlson |
| 6,110,382 | A | 8/2000 | Wiemers et al. |
| 6,214,773 | B1 | 4/2001 | Harris et al. |
| 6,435,277 | B1 | 8/2002 | Qu et al. |
| 6,488,091 | B1 | 12/2002 | Weaver |
| 6,640,898 | B2 | 11/2003 | Lord et al. |
| 6,911,419 | B2 | 6/2005 | Lord et al. |
| 6,913,080 | B2 | 7/2005 | Lehman et al. |
| 7,572,382 | B2 | 8/2009 | Mesher et al. |
| 7,575,690 | B2 | 8/2009 | Mesher et al. |
| 7,621,330 | B1 | 11/2009 | Walters et al. |
| 7,832,257 | B2 | 11/2010 | Weightman et al. |
| 8,162,048 | B2 * | 4/2012 | Termine et al. ......... 166/250.01 |
| 8,316,935 | B1 | 11/2012 | Termine et al. |
| 2003/0008781 | A1 | 1/2003 | Gupta et al. |
| 2003/0196809 | A1 | 10/2003 | Willberg |
| 2004/0112836 | A1 | 6/2004 | Manz et al. |
| 2007/0125718 | A1 | 6/2007 | Abney et al. |
| 2008/0119674 | A1 | 5/2008 | Randal et al. |
| 2009/0090504 | A1 * | 4/2009 | Weightman et al. ..... 166/250.01 |
| 2011/0232368 | A1 | 9/2011 | Al-Dhafeeri et al. |

FOREIGN PATENT DOCUMENTS

| | | |
|---|---|---|
| EP | 0380359 B1 | 12/1993 |
| EP | 0385801 B1 | 1/1994 |
| EP | 0535301 B1 | 3/1996 |
| GB | 02228679 | 9/1990 |
| GB | 02228680 | 9/1990 |
| WO | 2006030385 A2 | 3/2006 |

OTHER PUBLICATIONS

Bessa, E; Deioiti, M.; Santanna, G.L.; "PhotocatalyticIH202 Treatment of Oil Field Produced Waters;" vol. 29 No. 2; Applied Catalyst B: Environmental; Jan. 15, 2001; Centro de Tecnologia; UFRJ; Water Pollution Control Lab; Rio de Janiero, Brazil.

Naeveke, R.; "Efficiency of Bactericides in Oil Field Water and Chemicals in Enhanced Petroleum Recovery;" vol. 37 No. 1; 34 pages; Erdoel Kohle, Erdgas, Petrochemical. Brennst-Chem; 1984; Federal Republic of Germany.

Carpenter, J.F.; Nalepa, C.J.; Abermarle Corporation; "Bromide-Based Biocides for Effective Microbiological Control in the Oil Field;" 9 pages; SPE International Symposium on Oilfield Chemistry; Feb. 2-4, 2005; The Woodlands, Texas, USA.

Cassinis, R.B.; Farone, W.A.; Portwood, J.H.; "Microbial Water Treatment: An Alternative Treatment to Manager Sulfate Reducing Bacteria (SRB) ActiVity, Corrosion, Scale, Oxygen, and Oil-Carry Over at Wilmington Oil Field—Wilmington, CA;" 15 pages; SPE Rocky Mountain Regional Meeting May 15-18, 1999; Gillette, Wyoming; USA.

Al-Hashem, Abdul; Borno, Amal AL; Brown, Mick D.; Carew, John A.; "The Synergistic|Anatagonistic Effect of Water Treatment Chemicals on Corrosion Inhibition of Carbon Steel in the Water Injection System of West Kuwait Oil Fields;" 15 pages; NACE International; CORROSION 2005; Apr. 3-7, 2005; Houston, Texas USA.

Carini, Frank H; Doran, Glenn, F; Drago, Joseph A; Fruth, Darrell A; Leong, Lawrence, Y.C.; "Evaluation of Technologies to Treat Oil Field Produced Water to Drinking Water or Reuse Quality;" 12 pages; 1997 Society of Petroleum Engineers, Inc.; SPE Annual Technical Conference and Exhibition Oct. 5-8, 1997; San Antonio, Texas, USA.

Water Treatment and Corrosion Control in Oil Field Water Injection Schemes of Upper Assam; Metals Abstract; Dec. 3, 1997.

"Effect of Biocide Dose on Corrosive Microbial Biofilms at an Oil Field Water Injection Field Test Facility;" Energy Science and Technology Database; 1991.

"Review of Treatment and Recycling of Produced Water from Heavy Oil Fields;" Energy Science and Technology Database; 1984.

* cited by examiner

METHOD OF DELIVERING FRAC FLUID AND ADDITIVES

CROSS-REFERENCE TO RELATED APPLICATIONS

This is a continuation of U.S. patent application Ser. No. 13/453,210, filed Apr. 23, 2012 (now U.S. Pat. No. 8,316, 935), which was a continuation of U.S. patent application Ser. No. 12/555,401, filed Sep. 8, 2009 (now U.S. Pat. No. 8,162, 048), which was a non-provisional of U.S. Provisional Patent Application Ser. No. 61/191,528 filed Sep. 9, 2008. Each of these applications are incorporated herein by reference, and priority to/of said applications is hereby claimed.

BACKGROUND OF THE INVENTION

Fracturing is the process of creating fractures in oil and gas formations to stimulate or increase production in oil and gas wells. The frac or fracturing operation involves the injection of fracturing fluid into the wellbore at sufficient pressures, flow rates and volumes to fracture the surrounding formation. The fracturing fluid may comprise a base fluid, such as water or gels, and a variety of additives including polymers, friction reducers, cross-linkers, anti-scaling agents, proppants and biocides. The fracturing forms a conductive flow path for hydrocarbons. However, once the fluid pressure in the fracture drops, the fracture closes. Therefore, proppants are injected with the base fluid to fill the fracture and prop it open. Materials used for proppants may include sand, ceramics and glass beads.

SUMMARY OF THE PRESENT INVENTION

The one or more embodiments of the invention facilitate the delivery of optimal volumes of a fracturing fluid containing optimal concentrations of one or more additives to a well bore. Conventional practice involves pre-staging large volumes of fracturing fluid with ad hoc additions of one or more additives. This results in poor or non-homogeneous dispersion of the additives, and frequently results in wasteful, non-optimal additive concentrations. In contrast, the one or more embodiments of the invention allow for accurately and precisely controlling the volume of the fracturing fluid delivered, at high flow rates, to the well bore. Advantageously, the fracturing fluid may also contain accurately and precisely controlled concentrations of one or more additives. In one or more embodiments, the concentration of the additives may be extremely small, even trace amounts, when compared to the large volume of the aqueous base fluid in which the additives are dispersed. One or embodiments of the invention disclose repeated testing and analysis of an aqueous base fluid which is utilized in formulating the fracturing fluid, in-line and prior to delivery to the well site. As a consequence of this testing and analysis, accurate adjustments to the physical and chemical characteristics of even large volumes, typically hundreds of thousands of gallons, of the aqueous base fluid may be made through the introduction of precise concentrations one or more additives. Since the additives may be blended in-line in the aqueous base fluid, prior to its delivery to the well site, the additives are homogeneously dispersed in the aqueous base fluid by the time the aqueous base fluid is used to formulate the fracturing fluid. In one embodiment of the invention, only optimal volumes of the aqueous base fluid are delivered to the well site. The testing and analysis continues at the well site, and also during the pumping of the aqueous base fracturing fluid into the well bore. Adjustments to the additive concentration may also be made to large but optimal volumes of the fracturing fluid pumped at high flow rates, from 5 to 150 bbls/minute, such that only optimal concentrations of the additives are utilized in the fracturing operation.

In one embodiment of the invention, a method for the controlled delivery of a fracturing fluid to a well bore comprises determining one or more available sources of an aqueous base fluid for the fracturing fluid. The one or more available sources of the aqueous base fluid comprises lakes, rivers, ponds, creeks, streams, well water, fluid effluent from industrial processes, brines, processed fluids, flowback fluids, pit water, spudder water, and other waste waters or fluids. One or more samples of each source may be individually tested to determine its physical and chemical characteristics, followed by comparing the physical and chemical characteristic data of each available source with predetermined physical and chemical characteristic data for an optimal fracturing fluid to identify suitability of the fluid source for a fracturing operation. A source of aqueous base fluid that compares favorably to the optimal fracturing fluid may be selected for delivery to the fracturing operation at the well site. The aqueous base fluid may be transported to one or more fracturing fluid tanks. The aqueous base may be transported by trucking or using a pumping mechanism with one or more pipelines connecting the pumps to the fracturing fluid tanks. In another embodiment, the one or more fracturing fluid tanks are grouped into one or more sets, wherein each set contains one or more fracturing fluid tanks. One set of fracturing fluid tanks may be positioned proximate a source of the aqueous base fluid for conveniently delivering the aqueous base fluid to a second set of fracturing fluid tanks that may be located proximate a well site. In another embodiment of the invention, the aqueous base fluid may be pumped from the source to a first set of fracturing fluid tanks, and thereafter pumped to a second set of fracturing fluid tanks.

One or more samples of the aqueous base fluid may be tested in the fracturing fluid tanks to determine its physical and chemical characteristics. The physical and chemical characteristics may comprise flow rate, pH, viscosity, ionic strength, volume, homogeneity, specific chemical concentrations, density, crystallization temperature, biocide demand and combinations thereof. Measurement of the physical and chemical characteristics is made using flow meters, pH meters, conductivity meters, and other instruments known in the art. These physical and chemical characteristic data may be then compared to the predetermined physical and chemical characteristic data for the optimal fracturing fluid.

In the event of a failed comparison, that is, if the physical and chemical characteristics of the sampled fluid differs from those of the optimal fracturing fluid, one or more additives, may be continuously introduced into the aqueous base fluid until it achieves the predetermined physical and chemical characteristics. Thus, for instance, if the aqueous base fluid is found to have scaling properties, anti-scaling additives may be introduce to the aqueous base fluid. On the other hand, if the aqueous base fluid is found to be corrosive, anti-corrosive chemicals may be introduced to the aqueous base fluid. The additives may be selected from a group comprising biocides, pH modifiers, corrosion inhibitors, friction reducers, scale inhibitors, oxygen scavengers, hydrogen sulfide, oxidizing agents, viscosifiers and combinations thereof. In one embodiment of the invention, the biocide comprises an oxidizing biocide. In another embodiment, the oxidizing biocide comprises a bromine biocide. The additives may be blended into the aqueous base fluid until they are homogeneously dispersed. The aqueous base fluid blend may be delivered to the well site for the fracturing operation. At the well site, the aqueous base fluid blend is used to formulate the fracturing fluid. Formulation of the fracturing fluid involves introduction of additives and/or one or more proppants to the aqueous base fluid blend. An optimal volume of the fracturing fluid is pumped at high flow rates to the well bore for fracturing the surrounding formations. The optimal volume of the fracturing fluid further comprises an optimal concentration of the homogeneously dispersed additives. In one embodiment of the invention, the optimal volume of the fracturing fluid is pumped to the well bore at from 5 to 150 bbls/minute. In another embodiment of the invention, the optimal volume of the fracturing fluid is pumped to the well bore at from 15 to 120 bbls/minute. In yet another embodiment of the invention, the optimal volume of the fracturing fluid is pumped to the well bore at from 60 to 100 bbls/minute.

In another embodiment of the invention, the aqueous base fluid from two or more of the sources may be commingled in the event the individual sources are unsuitable for the fracturing operation. At least one of the commingled sources may comprise water or fluids from another source, such as, spudder water, pit water, flowback fluid or other waste fluids generated during oil and gas production operations. These fluids have to be disposed and the disposal of the fluids entails transportation costs. By recycling these fluids (by commingling it with another source, typically a source of fresh water) as a base fluid for the fracturing operation, the well operator may save disposal costs, and have a readily available supply of the aqueous base fluid. It may also be possible to cut down on the huge volumes, typically tens of thousands of barrels, of the fresh water or frac water that is required for fracturing the wells, since the fresh water is now commingled with the easily available waste fluids.

The commingled aqueous base fluid may be transported to the fracturing operation in a first set of fracturing fluid tanks in the event the commingled aqueous base fluid is identified as suitable for the fracturing operation. One or more samples of the commingled aqueous base fluid may be tested in the first set of fracturing fluid tanks to determine its physical and chemical characteristics. In another embodiment of the invention, one or more samples of the commingled aqueous base fluid may be tested in-line while it is pumped to a first set of fracturing fluid tanks.

The physical and chemical characteristic data of the commingled aqueous base fluid may be compared to the predetermined physical and chemical characteristic data for the optimal fracturing fluid. If the characteristics are comparable, the commingled aqueous base fluid may be transported to the well site. If the physical and chemical characteristics of the commingled aqueous base fluid are not comparable to the optimal fracturing fluid, one or more additives may be continuously introduced into the commingled aqueous base fluid to achieve the same characteristics. The one or more additives may be blended into the commingled aqueous base fluid until it is homogeneously dispersed.

In one embodiment of the invention, the additives may be introduced in a controlled manner by one or more metering pumps. The addition of additives may be conducted in real-time. The metering pumps may be monitored at a control center manually or automatically. The control center may comprise one or more computers comprising a computer program product for automatically adjusting the dosage rates of the additives. The dosage rate may depend on a formation to be fractured, the conditions of a specific well and the physical and chemical characteristics of the commingled aqueous base fluid. The adjustments to the dosage rates may be made on-the-fly. The adjustments to the dosage rates may be made as-needed. The monitoring of metering pumps and adjustments to the additive dosage rate may also be conducted in real-time.

In one embodiment of the invention, a bromine-based biocide may be added to the commingled aqueous base fluid if it is determined to contain bacterial or other microbial living organisms. The bromine biocide is homogeneously dispersed within the commingled aqueous base fluid. The bromine biocide may be added in-line during pumping to the second set of fracturing fluid tanks or at the second set of fracturing fluid tanks, but prior to transportation to the well site. This ensures adequate bacterial/microbial "kill time" for the biocide to effectively eliminate these organisms. The addition of the bromine biocide may be automated.

The commingled aqueous base fluid blend may be delivered to a second set of fracturing fluid tanks when the commingled aqueous base fluid blend achieves the predetermined physical and chemical characteristics. One or more samples of the commingled aqueous base fluid blend may be collected, monitored and tested in-line during delivery to the second set of fracturing fluid tanks. The physical and chemical characteristics of the commingled aqueous base fluid blend may be continuously adjusted by introducing additives in-line and/or at the second set of fracturing fluid tanks. The second set of fracturing fluid tanks containing the commingled aqueous base fluid blend may be transported to the well site when the commingled aqueous base fluid blend achieves the predetermined physical and chemical characteristics.

In one embodiment of the invention, the second set of fracturing fluid tanks may be located at a distance from the well site. The commingled aqueous base fluid blend may be transported from the second set of fracturing fluid tanks to a third set of fracturing fluid tanks located at the well site when the commingled aqueous base fluid blend achieves the predetermined physical and chemical characteristics.

One or more samples of the commingled aqueous base fluid blend may be tested at the well site to determine its physical and chemical characteristics. The testing at the well site may be carried out in real-time using one or more simplified field test kits. Based on the testing results, one or more additives, such as viscosifiers, and/or one or more proppants may be added to, or their concentrations adjusted in, an optimal volume of the commingled aqueous base fluid blend to achieve the predetermined physical and chemical characteristics. The additives and/or proppants may be blended in the commingled aqueous base fluid to form the fracturing fluid. The one or more proppants further comprise sand particles, resin-coated particles, mineral fibers, ceramic particles, glass beads, aluminum pellets and mixtures thereof. The commingled aqueous base fluid blend may be pumped to a hopper or mixing equipment for admixing with the additives and/or proppants.

Conventional or existing practice involves introduction of one or more additives to the formation independent of the fracturing operation. The additives are added at the production site either directly into the well bore or by mixing in a hopper or mixing equipment along with large volumes of the fracturing fluid, proppants and other substances needed in the fracturing operation. This results in inadequate dispersion of the additives in the fracturing fluid and the blend is not homogeneous. The process also does not allow for the monitoring and feedback needed to control the rate of addition of the additives to the fracturing fluids. The well operators, therefore, do not have control over the additive concentration delivered to the formation, or whether an effective amount of additives has been added, or whether too much additives have been added in the fracturing operation. This results in inadequate or excessive concentrations of additives being used in the frac or fracturing operation. This adversely impacts the fracturing operation, resulting in loss of production. Furthermore, large volumes of one or more fracturing fluids are required in the fracturing operation since adequate information on the composition, flow rates and/or interaction between the one or more fracturing fluids and the one or more additives is not easily available. The well operators typically employ larger than necessary fracturing volumes in an attempt to overcome this lack of information. All of this results in an inefficient and costly process. There is also an environmental cost associated to this, since the flowback fluids return from the well bore after the fracturing operation is completed and have to be cleaned up, and proper disposal of certain toxic additives comprising biocides and surfactants has to be ensured, at the end of the fracturing process. Embodiments of the invention teach an efficient and cost-effective method for the controlled delivery of fracturing fluids to the well bore.

DETAILED DESCRIPTION

Figure 1:
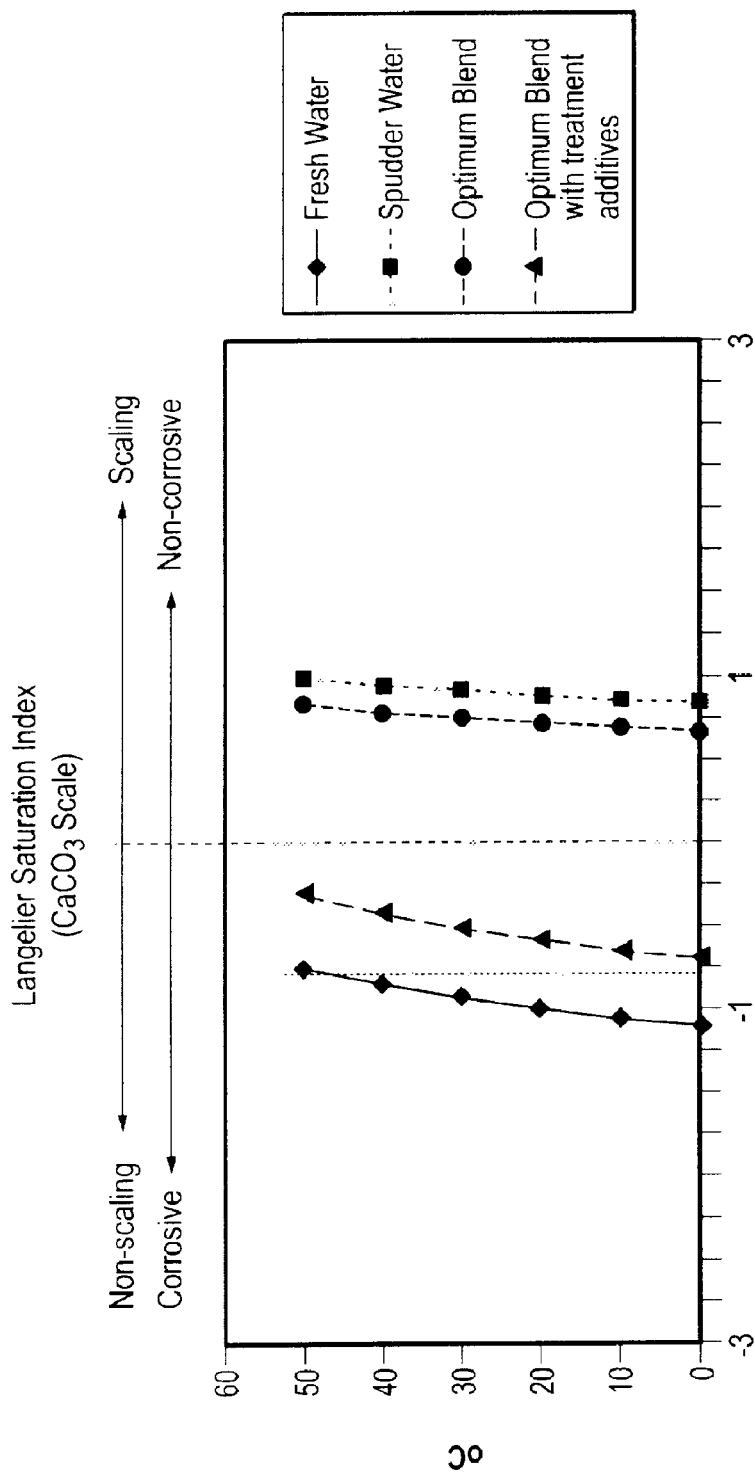
FIG. 1 shows the Langelier Saturation Index ("LSI") values of a first set of individual test fluids.

Embodiments of the invention disclose a method for delivering an aqueous base fluid with desired physical and chemical characteristics to a well site or rig site for the preparation of a fracturing fluid at the well site. The desired physical and chemical characteristics may be achieved through blending aqueous base fluids from multiple sources, including possibly waste water sources, and/or through the controlled introduction of any required additives to an individual source of the aqueous base fluid. The method of this invention allows for better monitoring of the introduced additives while controlling the volume of the fracturing fluids. In yet another embodiment, since the additives are introduced to and blended with the aqueous base fluid prior to reaching the well site, the additives are homogeneously dispersed within the aqueous base fluid. The homogenous dispersion of additives in the aqueous base fluid optimizes the efficacy of the fracturing fluid containing the aqueous base fluid in fracturing operations. Embodiments of the invention may accelerate production and increase the economic viability of wells and thus, reduce the pressure to abandon wells prematurely.

In one embodiment of the invention, aqueous base fluid from one or more available sources is collected. The aqueous base fluid may be obtained from one or more available sources comprising fresh water, processed fluids, brines, and other waste water. Fresh water sources further comprise lakes, rivers, ponds, creeks, streams and well water. The processed fluids further comprise spudder water, recycled flowback fluid from wellbores and fluid effluents from wells or industrial processes.

The composition and the physical, chemical and biological properties of the aqueous base fluid may differ depending on their source. One or more samples of the aqueous base fluid is collected from each source and tested to determine its relevant physical and chemical characteristic data. The physical and chemical properties to be determined may comprise fluid flow rate, pH, volume, homogeneity, viscosity, specific chemical concentrations, density, crystallization temperature, and combinations thereof. The aqueous base fluid may also be tested for compatibility with selected additives and cost effectiveness and ease of removal from the formation, ibis data is compared against predetermined physical and chemical characteristic data for a preferred or an optimal aqueous base fracturing fluid suitable for a particular fracturing operation. If the comparison is favorable, the aqueous base fluid from a given source may be selected for delivery to the well site.

In one embodiment, the aqueous base fluid from a selected source may be pumped or trucked to one or more fracturing fluid tanks. In another embodiment of the invention, aqueous base fluid from multiple sources can be blended or mixed to form a commingled aqueous base fluid. Advantageously, spudder water, flowback fluids or other waste waters or fluids generated during the drilling and production operations may be blended with fresh water to create the aqueous base fluid. This recycling of waste waters may also be desirable due to expensive disposal costs, both economic and environmental. Additionally, since large volumes of fracturing fluids are required to fracture the formation, procuring and transporting such large volumes of aqueous base fluids that meet specification or comply with predetermined physical and chemical characteristics may not always be easily possible. Commingling allows the use of waste fluids, for example, along with lesser quantities of fluids, such as fresh water. The commingled fluid is closer in physical and chemical characteristics to an optimal fracturing fluid. In one or more embodiments, the commingled aqueous base fluid requires less to no additives to achieve the predetermined physical and chemical characteristics when compared to using an aqueous base fluid from waste water sources, for example. Although hereinafter the specific embodiments are described with reference to the commingled aqueous base fluid, it should be understood that in other embodiments, individual sources of aqueous base fluid that meet the predetermined physical and chemical characteristics may be used in lieu of the commingled aqueous base fluid. Such individual sources of aqueous base fluid are intended to be encompassed within the scope of this invention.

The density of the commingled aqueous base fluid may range from 8.33 to 19.5 lb/gal. The fracturing fluid tanks may be grouped into one or more sets, wherein each set contains one or more fracturing fluid tanks. In one embodiment, a first set of fracturing fluid tanks is located off-site from the production facility. In another embodiment, the first set of fracturing fluid tanks is conveniently located at the well site.

The commingled aqueous base fluid in the first set of fracturing fluid tanks may be tested to determine its physical and chemical characteristics. One or more samples of the commingled aqueous base fluid are collected at one or more sampling stations or sampling ports at the first set of fracturing fluid tanks. In one embodiment, the commingled aqueous base fluid samples are obtained from each fracturing fluid tank.

The commingled aqueous base fluid samples may be tested for various characteristics comprising fluid composition, viscosity, and other physical and chemical properties. Each fracturing operation requires fracturing fluids of varying volumes, flow rates, physical and chemical properties. The test results from the first set of fracturing fluid tanks are compiled and analyzed to determine the commingled aqueous base fluid suitability for one or more fracturing operations. The results can also be stored using a computer program product for ready accessibility in the future.

In another embodiment, the commingled aqueous base fluid that meets the requirements of a particular fracturing operation is pumped to a second set of fracturing fluid tanks. Pipelines may be set up to accommodate one or more pumps. The second set of fracturing fluid tanks may be located offsite or proximate the well site. Samples of the commingled aqueous base fluid may be collected inline during the pumping to the second set of fracturing fluid tanks. The samples are again tested for key physical and chemical characteristic data. In the event of a failed comparison, one or more additives may be continuously introduced into the commingled aqueous base fluid in order for it to achieve the desired or predetermined physical and chemical characteristics. In one embodiment, the additives are directly injected in the commingled aqueous base fluid at one or more injection points along the pipeline.

The additives may perform several beneficial functions such as pH modification, killing microbial agents and corrosion inhibition. The additives may be selected from a group comprising biocides, pH modifiers, corrosion inhibitors, emulsion breakers, anti foams, hydrogen sulphide and oxygen scavengers, surface tension reducers, shale and clay stabilizers, paraffin/asphaltene inhibitors, scale inhibitors, and combinations thereof. In one embodiment of the invention, the additive comprises an oxidizing biocide. In another embodiment, the biocide comprises an organic and biodegradable bromine-based biocide.

The test samples may be repeatedly collected and analyzed and additives adjusted so that the addition of one additive does not create incompatibilities with the commingled aqueous base fluid and/or other additives. Sampling and testing may be repeated after each additive is added to the commingled aqueous base fluid until an optimal combination of additives is reached and the commingled aqueous base fluid achieves the desired or predetermined physical and chemical characteristics. In another embodiment, the sampling, testing and adjustment steps may be repeated at the second set of fracturing fluid tanks. In one embodiment, this testing and adjustment process is carried out manually and in real-time. In another embodiment, this testing and adjustment process is automated.

The additives may be introduced into the commingled aqueous base fluid by means of one or more metering pump. The metering pumps are observed or monitored in real-time by a control center. In one embodiment, the control center comprises one or more computers. The computers further comprise a computer program for adjusting the dosage rates of the additives depending on the formation to be fractured, the conditions of the specific well and the physical and chemical characteristics of the commingled aqueous base fluid. The additives are mixed inline or at the pumps with the commingled aqueous base fluids to ensure homogeneous dispersion and blending. One or more samples of the commingled aqueous base fluid blend are collected from sampling ports at the pumps or along the pipeline. The samples are tested for physical and chemical characteristics, and additional additives are introduced or dosage of the additives is adjusted if required.

In one embodiment, the testing of the commingled aqueous base fluid blend taken from a sample port is performed at the sample port itself and the resulting data is also analyzed at the sample port. The analyzed data is sent to one or more computers at a control center to determine information necessary to adjust additive dosage to achieve the predetermined physical and chemical properties for the commingled aqueous base fluid blend. This information is looped to the metering pump which injects the required volume, concentration and/or combination of one or more additives.

In another embodiment, the commingled aqueous base fluid blend taken from a sample port is tested at the control center and the result is processed and analyzed by the one or more computers at the control center. The instructions for making necessary adjustments, as analyzed by the one or more computers, are sent to the one or more metering pumps to adjust or control the amount of additive to be introduced to the commingled aqueous base fluid blend. In yet another embodiment, the instructions for making the necessary adjustments, as analyzed by the one or more computers, are sent to the one or more metering pumps to adjust or control the volume of the commingled aqueous base fluid blend.

Testing may be repeated after each additive is combined with the commingled aqueous base fluid blend until an optimal combination of additives is reached and the desired or predetermined physical and chemical characteristics are obtained. The testing and analysis may be carried out in real-time, thereby facilitating quick, on-the-fly and as-needed changes to the additive concentration or commingled aqueous base fluid volume.

In yet another embodiment, samples of the commingled aqueous base fluid blend are collected and analyzed manually. The additives are manually introduced or the volume of the commingled aqueous base fluid blend is controlled manually so that the commingled aqueous base fluid blend achieves the desired physical and chemical characteristics.

The commingled aqueous base fluid blend may be delivered to one or more fracturing fluid tanks or holding pits or tanks at the well site. Yet another round of testing may be conducted on samples of the commingled aqueous base fluid blend at the well site to determine the characteristics of the commingled aqueous base fluid blend to be delivered downhole. In one embodiment, testing at the well site is carried out in real-time using field test kits. The concentration of the additives and/or the volume of the commingled aqueous base fluid blend can quickly be adjusted or changed depending on the composition, flow rate, physical and chemical properties required for fracturing operation.

In another embodiment, the commingled aqueous base fluid blend is pumped to a hopper or mixing equipment for proper mixing of any additional additives or proppants introduced to the aqueous base fluid blend at the production site to create the aqueous based fracturing fluid or fracturing fluid. Controlled volumes of fracturing fluid which comprise desired concentration or dosage of the additives are then pumped to the formation at sufficient pressure and flow rates to fracture the formation. Since the volumes of fracturing fluid and the additive dosage is controlled on-demand, the fracturing operation is effective and cost-efficient.

Test Results

1. Blending of Spudder Water and Pond (or Fresh) Water.

Two water sources, a spudder water and pond water were used to formulate a slickwater fracturing fluid. The two water sources were initially analyzed for key parameters, listed below in Table 1, required by the well reservoir and the fracturing fluid formulation. The primary consideration in blending the fluids was to obtain a non-scaling and non-corrosive aqueous base fluid as defined by the Langelier Saturation Index (LSI). The Langelier Saturation index (LSI) is a well-known equilibrium model which provides an indicator of the degree of saturation of water with respect to calcium carbonate. The LSI can be interpreted as the pH change required to bring water to equilibrium. If the LSI is negative, there is no potential for scaling and the water will dissolve calcium carbonate. However, a negative LSI value indicates propensity for corrosion. If the LSI is positive, on the other hand, scales may form and calcium carbonate precipitation may occur. Ideally, in production operation, the LSI for the fracturing fluids should be closer to zero or in the negative (corrosive) range.

TABLE 1

| Key Parameters | Spudder water | Pond water | Blended water |
|---|---|---|---|
| Sodium, ppm | 783 | 3 | 378 |
| Calcium, ppm | 15 | 4 | 17 |
| Magnesium, ppm | 7 | 2 | 4 |
| Barium, ppm | <1 | <1 | <1 |
| Potassium, ppm | 8 | 16 | 8 |
| Iron, pp. | 1 | <1 | <1 |
| Total Alkalinity, ppm | 386 | 56 | 220 |
| Carbonate alkalinity, ppm | 67 | 0 | 16 |
| Bicarbonate alkalinity, ppm | 320 | 56 | 204 |
| Sulfate, ppm | 16 | <5 | 7 |
| Chloride, ppm | 1010 | <20 | 540 |
| pH | 8.9 | 8 | 8.8 |
| Specific gravity | 1,002 | 1,000 | 1,002 |
| Total Dissolved solids, ppm | 2226 | 80 | 1175 |
| Total Hardness, ppm | 64 | 18 | 62 |
| Scaling Index, LSI @50° C. | 1.00 | −0.75 | 0.85 |

The initial data for the two water sources is listed above in Table 1. As shown in FIG. 1, calculation of the LSI value for the spudder water is greater than zero, which indicates it to be scaling. It may be undesirable to have scaling tendencies in an aqueous base fluid used in formulating a fracturing fluid because it interferes with the main objective of fracturing the formation. Conventional practice would be treat the spudder water with chemical additives at the well site to obtain a LSI value less than zero. In this test, the spudder water was blended with the pond water to form a "blended water" with more favorable LSI values even prior to any chemical treatments. Advantageously, the blending of the two water sources created an aqueous base fluid that is more desirable and required less chemical treatment.

An optimum blend volume ratio of 48:52 spudder water to pond water was created based upon maximum volume usage of spudder pond water, shifting of the LSI value towards a non-scaling, minimally corrosive fluid, and minimum additive treatment. The maximum volume usage of the spudder water may be desirable as a means to recycle the water previously used to spud the well and avoid future disposal cost. The blended water using spudder water and pond water still had an unacceptable LSI value due to the alkalinity concentration and pH. The chemical additive, TDP 452, an inorganic acid with corrosion inhibitor was recommended to treat the blended fluid to result in a final LSI of less than zero indicating a non-corrosive and non-scaling fluid. Based upon the chemical composition of the blended waters as given in Table 1 and modeling using the LSI equation, an alkalinity value of less than 100 mg/l and pH of less than 8.0 were set as the threshold value on the final treated fluid.

Figure 2:
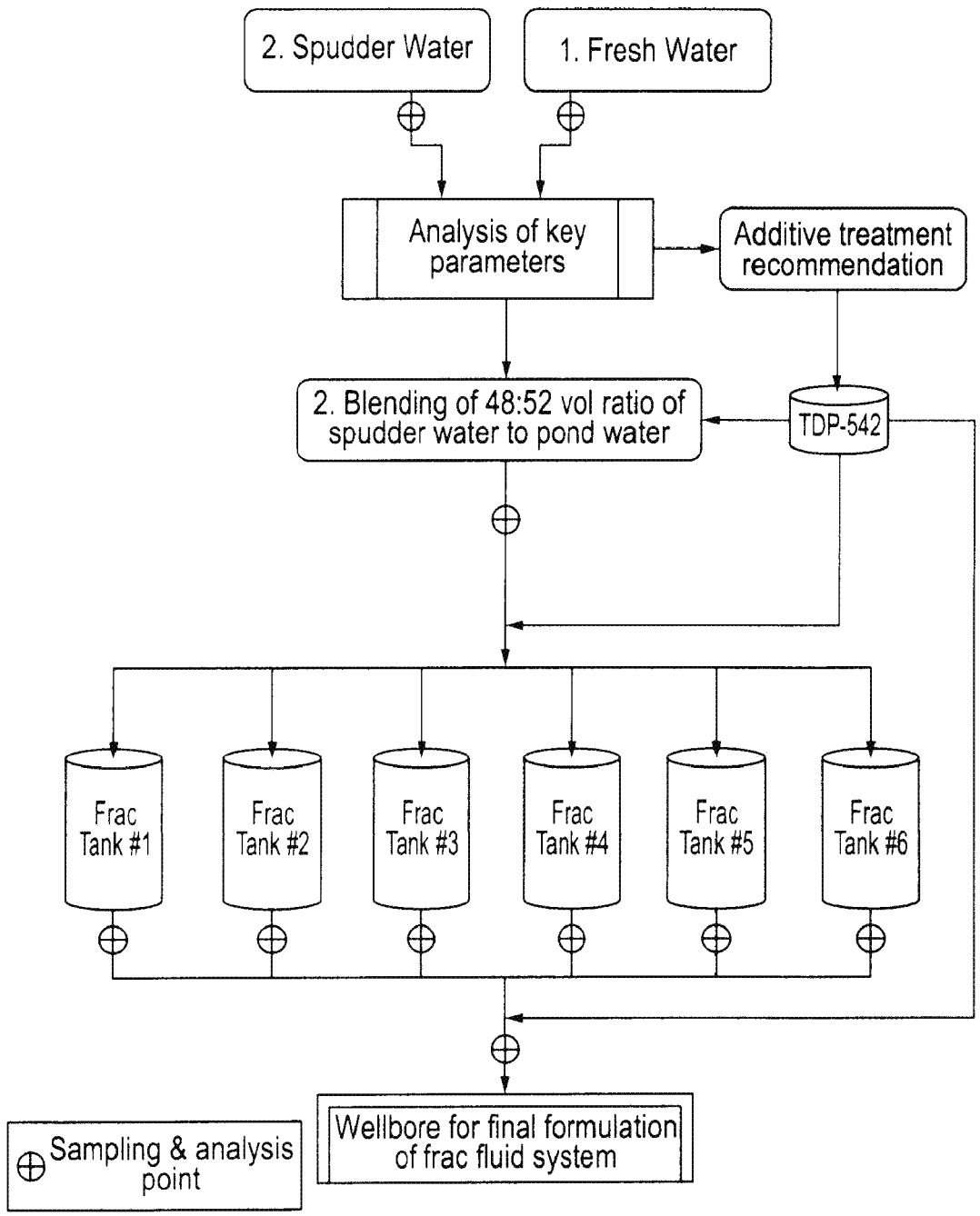
FIG. 2 shows an embodiment of the invention.

The real-time analysis, water transfer, additive injection point and control mechanism is illustrated in FIG. 2. Conventional practice is to treat water onsite in the fracturing fluid tanks. Disadvantages of the conventional practice may include inadequate mixing of treatment chemicals and potential for over or under treatment of chemical additives. This testing showed that after blending of the waters near the water source location, chemical treatment may be added inline as the fluid is transported towards the well site. The spudder water and pond water are blended and treated simultaneously with TDP 452. As the treated blended water is transported to the well site the injected chemical additive. TDP 452 has time to mix homogeneously, it is monitored and analyzed at various points including after initial introduction of TDP 452, at the fracturing fluid tanks and just prior to formulation of the final slickwater fracturing fluid. At each of the points of analysis as shown in FIG. 2, two parameters, alkalinity and pH were monitored. As the alkalinity and pH deviated from the threshold value, the TDP 452 chemical injection pump was adjusted accordingly. The injection points for TDP 452 were placed immediately after blending of the two water sources, inline during water transport to the fracturing fluid tank storage and inline between water transport from the fracturing fluid tank storage to the well bore. These multiple chemical injection points and real time analyses ensured proper treatment and quality control.

Figure 3:
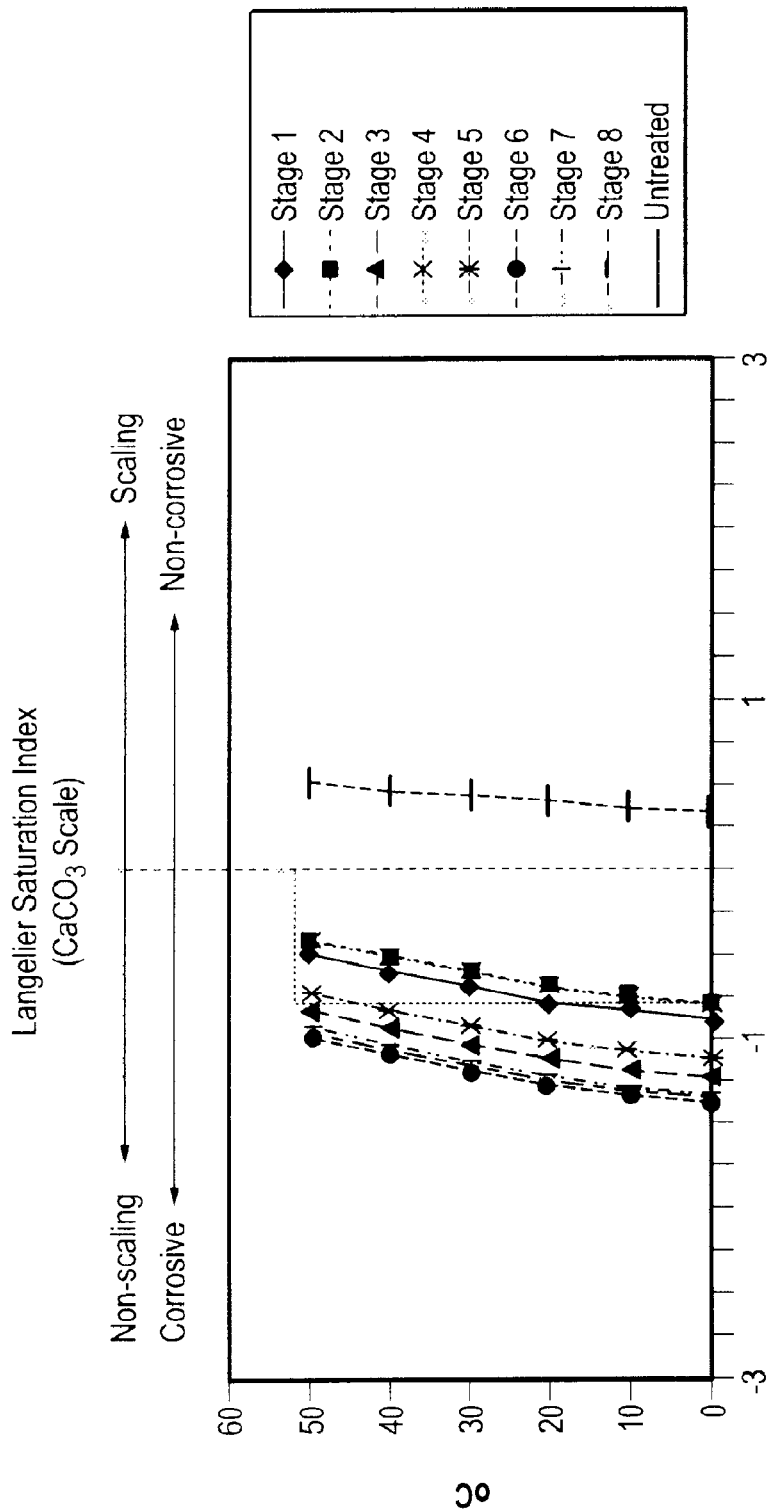
FIG. 3 shows the LSI values of a first blended or commingled fluid.

This well was fractured in eight stages, utilizing a slick water fracturing system. Table 2 list the volumes of each source of water utilized for each fracturing stage. As shown in FIG. 3, the LSI value of the treated blended water during each fracturing stage was monitored in real time and maintained to shown constant compliance to specifications. This was accomplished by continuous monitoring downstream of the additive treatment injection points and feedback of data to additive injection points for appropriate adjustments.

TABLE 2

| Stage | Spudder water | Pond water | Total Volume Pumped |
|---|---|---|---|
| 1 | 5060 bbl | 5,710 bbl | 10,770 bbl |
| 2 | 4,340 bbl | 4,760 bbl | 9100 bbl |
| 3 | 3,900 bbl | 4,550 bbl | 8450 bbl |
| 4 | 6,450 bbl | 7,680 bbl | 14,130 bbl |
| 5 | 4,380 bbl | 5,410 bbl | 9790 bbl |
| 6 | 4,100 bbl | 4,320 bbl | 8420 bbl |
| 7 | 3,980 bbl | 4,440 bbl | 8420 bbl |
| 8 | 3,640 bbl | 4,130 bbl | 7770 bbl |

2. Blending of Fluids from a Multiple Water Sources Followed by Biocide Treatment.

Multiple water sources, lake water, reserve pit (#1) water and water from a second (#2) pit were used to formulate the fracturing fluid. The water sources were initially analyzed for key parameters, listed in Table 3 as required by the well reservoir and fracturing system formulation. The primary considerations included non-scaling, minimally corrosive water as defined by LSI along with ensuring that the blended water was bacteria free.

Figure 4:
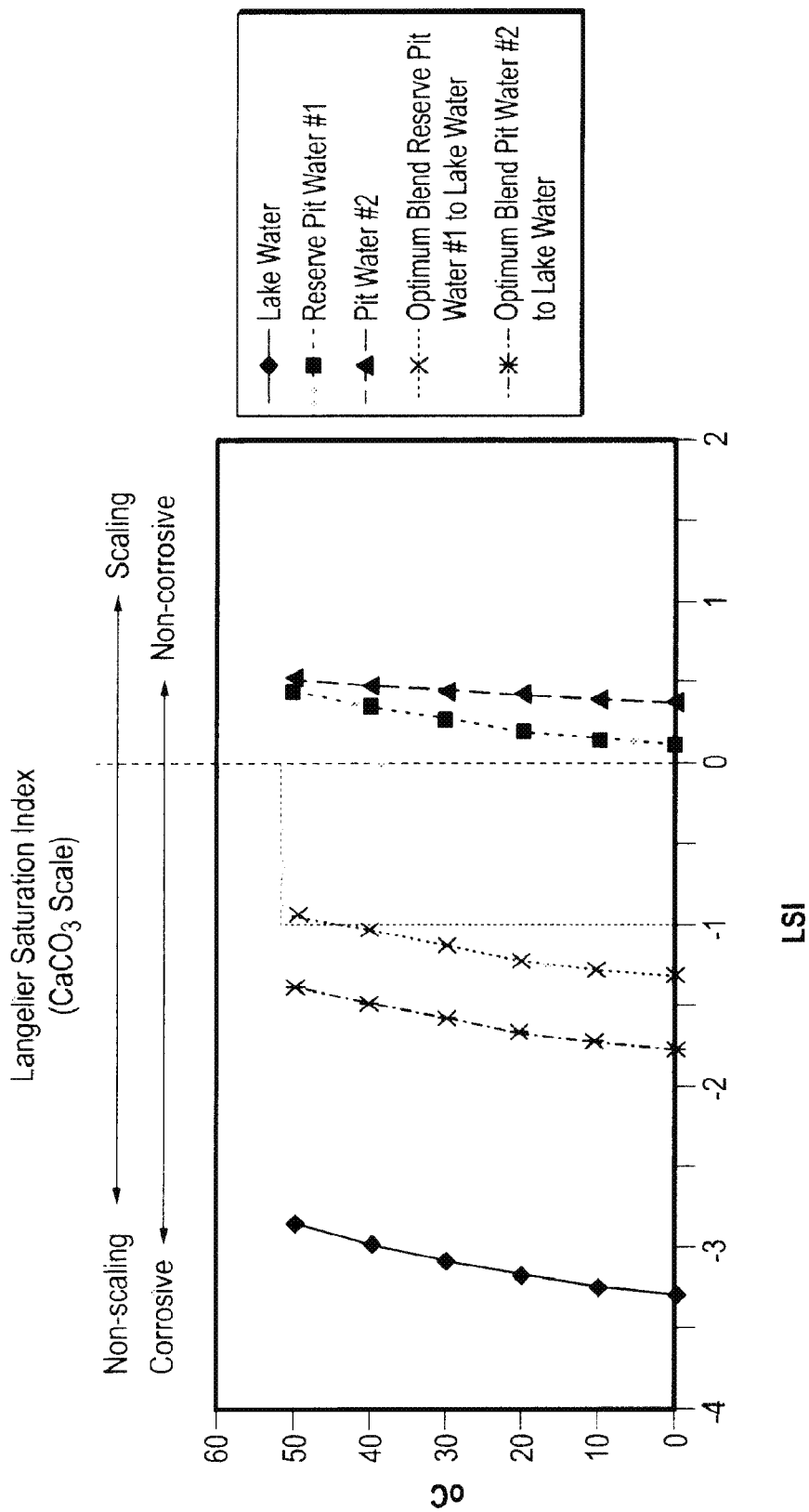
FIG. 4 shows the LSI values of a second set of individual test fluids.

The initial analytical data on the three water sources is listed in Table 3. As shown in FIG. 4, the LSI value for the reserve pit and the second pit water are greater than zero, indicating scaling water. Conventional practice would be to treat each of these water sources individually with chemical additives to shift the LSI to a value equal to or less than zero. In this test, these multiple sources of water were blended, resulting in a more favorable LSI value.

TABLE 3

| Parameters | Lake water Water | Reserve pit #1 | Reserve pit #2 | Blend A Lake + Reserve Pit #1 | Blend B Lake + Reserve Pit #2 |
|---|---|---|---|---|---|
| Calcium, ppm | 2 | 53 | 16 | 12 | 4 |
| Magnesium, ppm | 2 | 19 | 4 | 5 | 2 |
| Iron, pp. | 3 | 3 | 0.8 | 3 | 2.6 |
| Total Alkalinity, ppm | 18 | 192 | 111 | 53 | 37 |
| Hydroxide Alkalinity, ppm | 0 | 0 | 0 | 0 | 0 |
| Carbonate alkalinity, ppm | 0 | 0 | 9 | 0 | 0 |
| Bicarbonate alkalinity, ppm | 18 | 192 | 111 | 53 | 37 |
| Sulfate, ppm | <10 | <10 | <10 | <10 | <10 |
| Chloride, ppm | <28 | 1524 | 2889 | 327 | 598 |
| pH | 6.72 | 7.66 | 8.74 | 7.48 | 7.53 |
| Total Dissolved solids, ppm | 115 | 2896 | 1005 | 671 | 293 |
| Total Hardness, ppm | 10 | 210 | 55 | 60 | 19 |
| Bacteria, cfu/ml | | | | 14500 | 102,000 |
| Scaling Index, | −2.86 | 0.44 | 0.52 | −0.93 | −1.38 |

LSI @50° C.

Two optimum blends utilizing a combination or each pit water source with the lake water was created based upon maximum volume usage of reserve pit #1 and reserve pit #2 waters with minimum additive treatment. The maximum volume usage of these two reserve pit waters is highly desirable as a means to recycle the previously used water and avoid future disposal cost. In this particular case, the primary problems were scaling, corrosivity and bacterial contamination of reserve pit waters as illustrated in the LSI graph in FIG. 4 and bacterial contamination data listed in Table 1. The initial analytical data was used to dictate the blending of one part reserve pit #1 water with four parts lake water to result in non-corrosive and non-scaling water as shown in FIG. 4. An additive, namely, a bromine-based biocide, such as, BioRid®. (BioRid is a registered trademark of TETRA Technologies, Inc. of Houston, Tex.), was recommended for addition to the blended water to address the bacterial contamination. Additional volumes of water was made up with one part of pit Water #2 to four parts of lake water to result in non-corrosive and non-scaling water as shown in FIG. 4. A recommendation of treatment of biocide to the blended water was also made to address the bacterial contamination. The blending of the reserve pit waters with the lake water eliminated the use chemical additives to achieve a substantially less non-corrosive and non-scaling water.

Both blended waters required treatment with a biocide to perform a complete kill of bacteria. Biocide treatments are especially sensitive to contact time for effective bacterial kill. Conventional practice is to treat water with additives such as biocides at the rig site in the fracturing fluid tanks. The disadvantages of the conventional practice include inadequate missing of the treatment chemicals, insufficient kill time for biocide to perform a complete bacterial kill and potential over or under treatment of chemical additives. These testing shows that after blending of the waters near the location of the water source, chemical treatment with a biocide may be performed inline as the fluid is transferred towards the well site. As the treated water is transported to the well site, the injected chemical additive has time to mix homogeneously and perform a complete bacterial kill.

Figure 5:
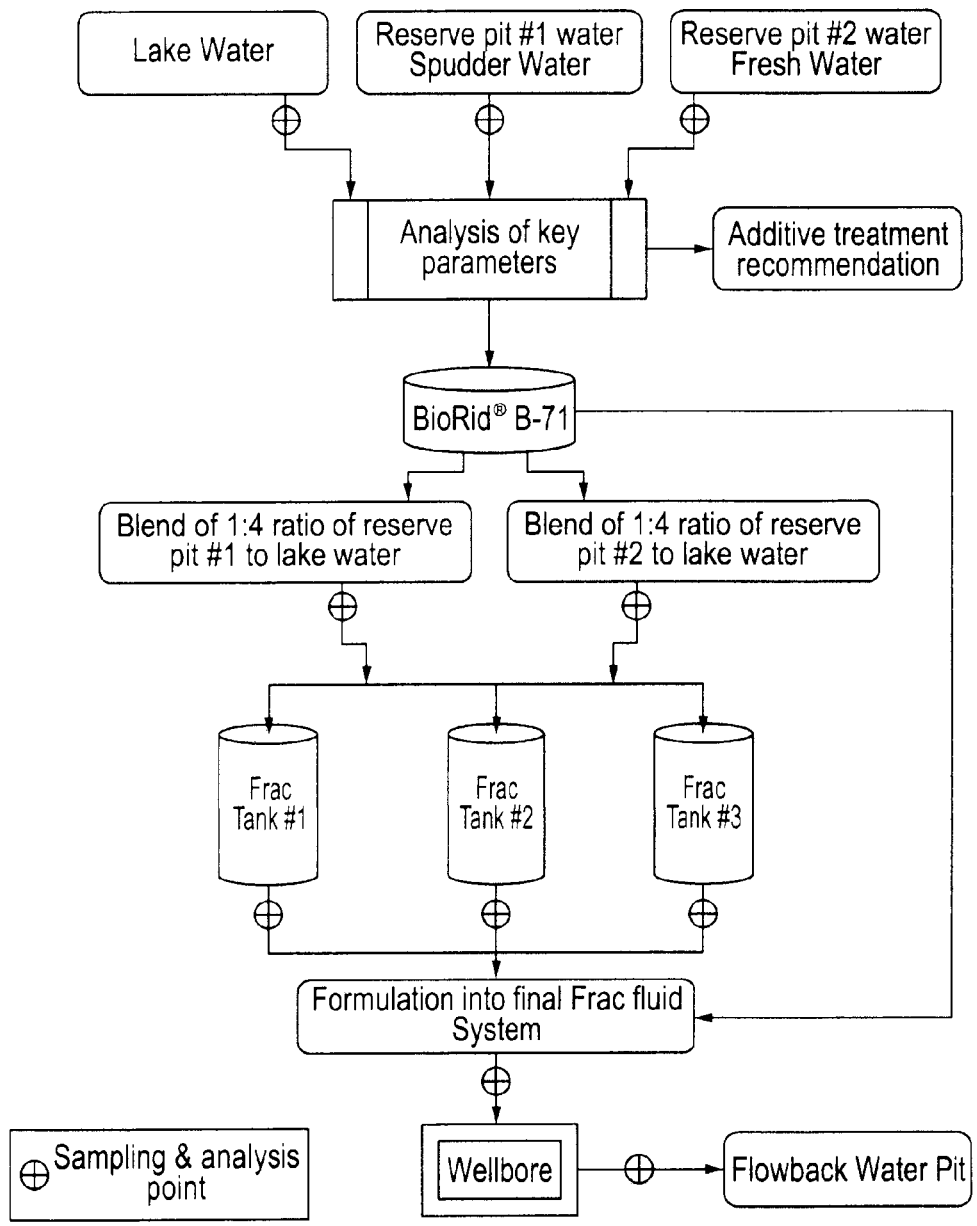
FIG. 5 shows another embodiment of the invention.

The real-time analysis, additive injection point and control mechanism for bacterial treatment with the biocide on blended water is illustrated in FIG. 5. In this particular application of the biocide, real-time analysis monitored the residual bromine concentration in the water to indirectly assure bacterial kill. The threshold value for maintaining a continuous effective bacterial kill was 10 ppm residual bromine. Continuous real time sampling and analyses occurred after blending of the Waters, at the fracturing fluid tanks and after water is used to formulate the final fracturing fluid. At all these points, the real-time analysis data was utilized continuously to monitor residual bromine and adjustments of the treatment rate of the biocide were made at the initial blending of waters and prior to injection of fracturing fluid into the well bore. The placement of injection points for the biocide was designed to ensure a complete kill of bacteria and quality assurance of required residual active biocide for effective downhole control of bacteria.

Figure 6:
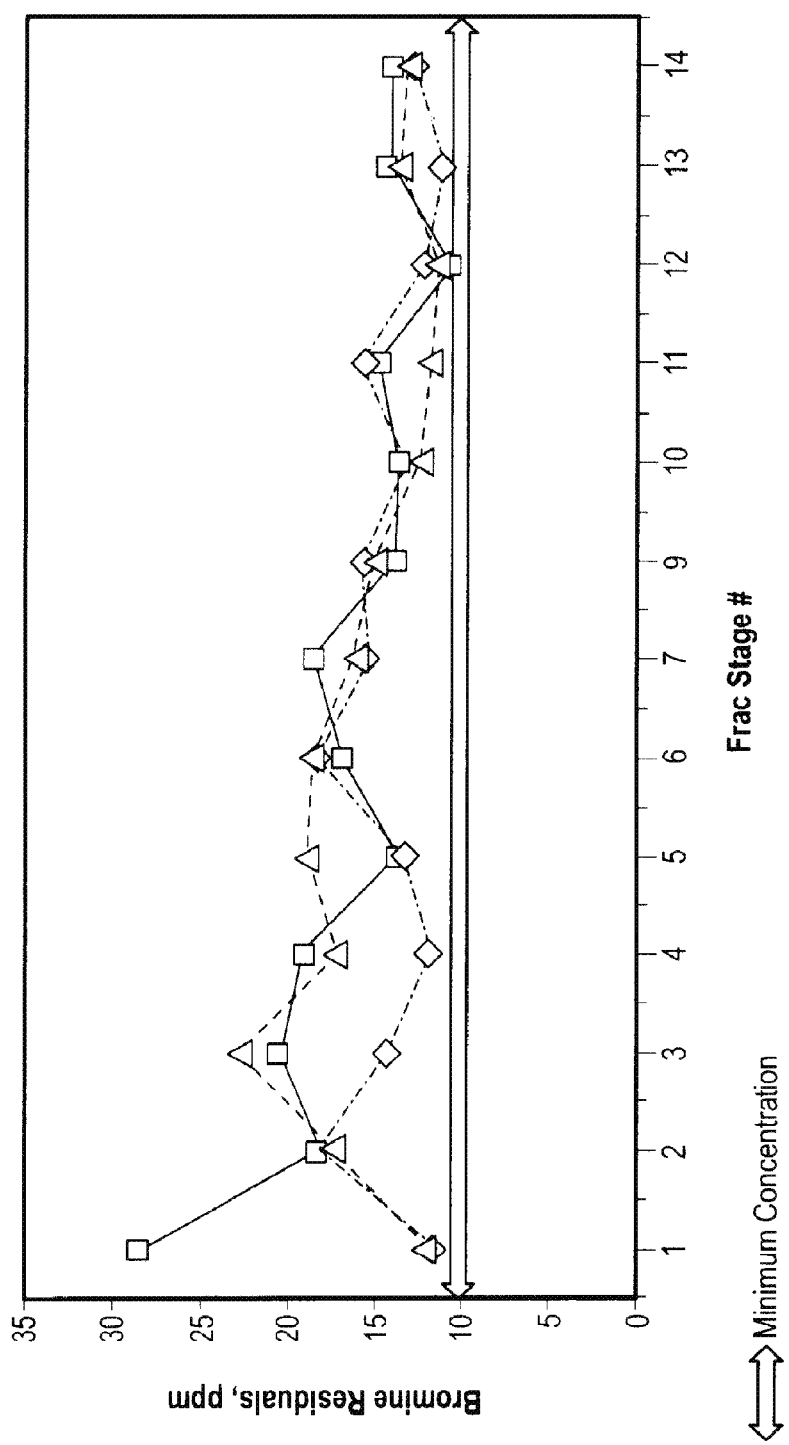
FIG. 6 shows the LSI values of a second set of blended or commingled fluids.

This well was fractured in thirteen stages, utilizing a slick water fracturing fluid. Table 4 list the volumes of each source of water utilized for each fracturing stage. As shown in FIG. 6, effective biocidal treatment was maintained during all stages as all sample point bromine residuals were above 10 ppm. The treated blended water during each fracturing stage was monitored in real time and maintained to shown constant compliance to specifications. This was accomplished by continuous monitoring downstream of the additive treatment injection points and feedback of data to additive injection points for appropriate adjustments.

TABLE 4

| Stage # | Reserve Pit Water | Lake Water | Total Volume Pumped |
|---|---|---|---|
| 1 | 3,300 bbl | 13,200 bbl | 16,500 bbl |
| 2 | 3,200 bbl | 12,800 bbl | 16,000 bbl |
| 3 | 3,300 bbl | 13,200 bbl | 16,500 bbl |
| 4 | 3,200 bbl | 12,800 bbl | 16,000 bbl |
| 5 | 3,100 bbl | 12,400 bbl | 15,500 bbl |
| 6 | 3,100 bbl | 12,400 bbl | 15,500 bbl |
| 7 | 3,100 bbl | 12,400 bbl | 15,500 bbl |
| 9 | 3,000 bbl | 12,000 bbl | 15,000 bbl |
| 10 | 3,100 bbl | 12,400 bbl | 15,500 bbl |
| 11 | 2,940 bbl | 11,760 bbl | 14,700 bbl |
| 12 | 3,000 bbl | 12,000 bbl | 15,000 bbl |
| 13 | 3,000 bbl | 12,000 bbl | 15,000 bbl |
| 14 | 3,100 bbl | 12,400 bbl | 15,500 bbl |

In another embodiment, one or more proppants and/or other substances comprising friction reducers, that improve the flow characteristics and effectiveness of the fracturing fluid in fracturing the rock formation are also pumped into the hopper along with the commingled aqueous base fluid blend. Proppants comprise sand, fine gravel or glass heads that serve to keep the fracture open after the fracturing operation. Fluid loss agents may be added to the hopper. Fluid loss agents partially seal off the more porous sections of the formation so that the fracturing occurs in the less porous strata. Viscosifying agents may also be added to the hopper. Viscosifying agents allow the propping agent to be dispersed within the fluid during injection so that it is more easily carried to the pay zone. The adjusted aqueous base fluid blend, proppants and other substances are blended in the hopper to form a slurry. In one embodiment of this invention, samples of the slurry are tested by the well operators and adjustments are made to one or more components of the slurry.

Powerful fracturing pumps inject the fracturing fluid to the formation through the well bore. The fracturing fluid is pumped in sufficient volumes, and at sufficient pressure and flow rates to fracture the formation. The fracturing fluid is pumped in via the casing or tubing or through the annular space. Electronic monitoring systems provide constant feedback to the well operators. Fluid flow rates and pressure buildup within the formation are monitored to ensure that fracturing growth rate is safe and controlled. The fracturing is generated and propagated as pumping continues to permit placement of the proppants. The pressure is then relieved allowing the oil to seep through the fractures in to the well bore where it is pumped hack to the well bore. The fractured formation is held open after the pressure is released by one or more proppants in the slurry. The well is then shut in and backflowed to remove the fracturing fluid from the propped fracture. The fracturing fluid is recovered as flowback water.

The flowback water is sampled to determine its physical and chemical properties and to determine residual trace quantities of biocides and/or other contaminants. In one embodiment, the flowback water is pumped hack to a storage tank for use as aqueous base fluid in the same or other fracturing operation.

In another embodiment, a method for the controlled delivery of a fracturing fluid to a well bore to control scaling and corrosion within the well bore comprises predetermining the physical and chemical properties of an optimal aqueous base fracturing fluid. One or more samples of a commingled aqueous base fluid may be tested prior to piping to the well bore to analyze its physical and chemical properties. One or more additives are introduced into the commingled aqueous base fluid prior to delivering it to the well bore. The selected additives comprise substances that reduce scaling and corrosion within the well bore. One or more samples of the commingled aqueous base fluid are tested after the additives have been introduced, but prior to delivery to well bore, to analyze their physical and chemical properties. The analyzed results are evaluated to ascertain if they are in line with the predetermined physical and chemical properties. The physical and chemical properties data resulting from the testing and analyzing may be sent to a control center. The necessary adjustments to the physical and chemical properties of the commingled aqueous base fluid can be made until the fracturing fluid is or is substantially less non-corrosive and non-scaling.

In another embodiment, the commingled aqueous base fluid is pumped or trucked to a set of fracturing fluid tanks. The fracturing fluid tanks may be located either onsite or offsite from the well location. One or more additives are introduced to the commingled aqueous base fluid through one or more metering pumps. The additives are mixed inline and blended with the commingled aqueous base fluid. One or more samples of the commingled aqueous base fluid blend are collected from sampling ports and tested at a control center. The result is processed and analyzed by one or more computers located at the control center. The computers transmit instructions for making necessary adjustments to the one or more metering pumps to adjust or control the amount of additive to be introduced to the commingled aqueous base fluid. The commingled aqueous base fluid blend is then delivered to the production facility for fracturing the formation.

A method for delivering a controlled volume of fracturing fluid to the wellbore is disclosed in another aspect of the invention. Current practice involves pumping large volumes of fracturing fluid varying from a few hundred gallons to over hundreds of thousand gallons per well. Some of the fracturing fluid is immediately recovered as flowback water to maintain the productivity of the wells and reduce plugging of the fractured formations due to fracturing fluid residues and filter cake buildup thereon. Due to increasing emphasis by regulatory bodies on minimizing environmental impact, disposal of fracturing fluids has also become a problem, especially if the fluids contain environmentally offensive additives and biocides. The various embodiments of the invention teach the introduction of controlled volumes of fracturing fluids into the formation. The method of the invention teaches collection of and analysis of the commingled aqueous base fluid samples, obtained by commingling aqueous base fluids from one or more sources, at one or more locations offsite from the production zone. Controlled dosage of additives is introduced to the commingled aqueous base fluid until the commingled aqueous base fluid achieves the predetermined physical and chemical properties. Since the commingled aqueous base fluid is blended well with the additives, and since the composition and physical and chemical properties of the commingled aqueous base fluid blend are predetermined and adjusted depending on the requirements of the fracturing operation, the method of this invention can deliver reduced or controlled volumes of the fluid to the production site and then to the formation for the fracturing operation. The volume of the fracturing fluid can also be adjusted "on the fly" depending on the fracturing operation, since the composition and physical and chemical properties of the commingled aqueous base fluid are pre-tested and, therefore, known before it is even delivered to the production site.

The methods of the invention further comprises the introduction of one or more additives in a fracturing operation by using the commingled aqueous base fluid as a carrier or a delivery conduit. Additives perform several beneficial functions such as pH modification, killing microbial agents and corrosion inhibition. In one aspect, one or more additives are introduced into the commingled aqueous base fluid using one or more metering pumps. The concentration of the additives in the commingled aqueous base fluids is adjusted by a multi phase process of testing and analysis, both offsite and at the production facility.

In another embodiment, a method for the controlled introduction of one or more environmentally friendly biocides in a fracturing operation is disclosed. In prior fracturing operations, the biocides that were used were often toxic. Moreover, since the biocides were added to the fracturing fluid at the production site, the biocides were not homogeneously dispersed in the fracturing fluid and therefore, larger concentrations of the biocides were introduced in the fracturing fluid to achieve the desired "kill rate" for bacilli and other living organisms. At the conclusion of the fracturing operation, the fracturing fluid containing the toxic biocides was labeled waste water and disposed. In one embodiment of the present invention, one or more oxidizing and organic bromine-based biocides are introduced to the aqueous base fluids using metering pumps. On the contrary, the bromine-based biocides of the invention can be measured before their introduction in the commingled aqueous base fluid and then sampled and tested after they are added to the commingled aqueous base fluid. The dosage of the bromine biocides is controlled and adjusted to achieve the desired concentration. The contact time for the bromine biocide is designed into the hold time in the fracturing fluid tanks. Advantageously, since the bromine biocides are oxidizable and biodegradable, they are less toxic to the environment. If the bromine biocide is spilled or leaked, it is gone in minutes to hours due to the reactivity of the biocide with light and elements in the environment. This also negates the necessity, and associated expenses, to dispose the bromine biocides. Advantageously, the bromine based biocides of the invention also have a faster microbial kill rate and a level of stability which when applied to the commingled aqueous base fluid results in purer commingled aqueous base fluid. Pure fluids are preferred in fracturing operations. In one embodiment of the invention, the flowback fluid is collected and tested to determine the presence of any residual biocides. The flowback fluid may be then treated with additives to neutralize the residual biocide prior to disposal and/or transfer to a holding tank.

The method of this invention teaches the stimulation of oil and gas wells by controlling the concentration of additives and fracturing fluid volumes needed in a fracturing operation The method of controlling additive concentration and fracturing fluid volume as taught by this invention can increase the production rate of the well by forming highly conductive holes in the fractured formation and improve the economics of the fracturing operation. Advantageously, the method of the invention reduces the costs involved in fracturing fluid clean-up and disposal of recovered fracturing fluids. Furthermore, in one aspect, the method of the invention provides an environmentally friendly method to stimulate the oil and gas bearing formation by controlled introduction of non-toxic and biodegradable additives.

While the invention has been particularly shown, described and illustrated in detail with reference to one or more embodiments and modifications thereof, it should be understood by those skilled in the art that equivalent changes in form and detail may be made therein without departing from the true spirit and scope of the invention as claimed.

The invention claimed is:

1. A method for controlled delivery of a fracturing fluid to a well bore comprising:
    (a) identifying a source of an aqueous base fluid for the fracturing fluid and providing predetermined physical and chemical characteristic data for the fracturing fluid;
    (b) transporting aqueous base fluid, obtained from the source of aqueous base fluid identified in step "a", to a well site for fracturing operations;
    (c) during step "b" testing the aqueous base fluid being transported, and comparing the tested physical and chemical characteristic data to the predetermined physical and chemical characteristic data for the fracturing fluid;
    (d) during steps "b" and "c", in the event of a failed comparison, introducing at least one additive to treat the aqueous base fluid being transported;
    (e) repeating steps "c" and "d" until the aqueous base fluid being transported achieves the predetermined physical and chemical characteristics;
    (f) after step "e", transporting the treated aqueous base fluid to a fracturing system, the fracturing system including a fracturing pump;
    (g) after step "f", formulating the fracturing fluid with the treated aqueous base fluid, and the pump of the fracturing system pumping the fracturing fluid into the wellbore for fracturing operations.

2. The method of claim 1, wherein testing in step "c" is performed downstream of the at least additive introduced in step "d" and upstream of the fracturing system.

3. The method of claim 1, wherein the additives are homogeneously dispersed in the aqueous base fluid before being transported to the fracturing system.

4. The method of claim 1, wherein the at least one additive includes a bromine biocide, and further comprising the step of testing at least one sample of flowback fluids at the conclusion of the fracturing operations to identify residual traces of the bromine biocide.

5. The method of claim 1, wherein in the additives include pH modifiers and scale inhibitors.

6. The method of claim 1, wherein during step "d" the aqueous base fluid is delivered to the fracturing system located proximate to the well site.

7. The method of claim 1, wherein first during step "d" the aqueous base fluid is first delivered to a first set of fracturing fluid tanks located proximate to the source of aqueous base fluid, and second during step "f" delivered to the fracturing system located proximate to the well site.

8. The method of claim 1, wherein step "c" is performed in real time, and step "d" is performed on the fly.

9. The method of claim 1, further comprising adjusting the volume of the fracturing fluid and/or the concentration of the additives in the fracturing fluid on-the-fly during the pumping of the fracturing fluid to the well bore.

10. The method of claim 1, wherein during step "d" a plurality of different additives are introduced and testing of the aqueous base fluid being transported is made of each of the plurality of different additives introduced.

11. The method of claim 1, wherein the source of aqueous base fluid is remote from the wellbore.

12. The method of claim 1, wherein the at least one additive is introduced continuously in a controlled manner.

13. A method for controlled delivery of a fracturing fluid to a well bore comprising:
    (a) identifying a source of an aqueous base fluid for the fracturing fluid and providing predetermined physical and chemical characteristic data for the fracturing fluid;
    (b) testing the identified source of aqueous base fluid to determine the source's physical and chemical characteristics;
    (c) comparing the tested physical and chemical characteristic data of the identified source of aqueous base fluid to the predetermined physical and chemical characteristic data for the fracturing fluid to identify suitability of the identified source for fracturing operations;
    (d) after step "c", if a favorable comparison is made to the predetermined physical and chemical characteristic data for the fracturing fluid, transporting aqueous base fluid, obtained from the source of aqueous base fluid identified in step "a", to a well site for fracturing operations;
    (e) during step "d" testing the aqueous base fluid being transported, and comparing the tested physical and chemical characteristic data to the predetermined physical and chemical characteristic data for the fracturing fluid;
    (f) during steps "d" and "e", in the event of a failed comparison, introducing at least one additive to treat the aqueous base fluid being transported;
    (g) repeating steps "e" and "f" until the aqueous base fluid being transported achieves the predetermined physical and chemical characteristics; and
    (h) after step "g", transporting the treated aqueous base fluid to a fracturing system, the fracturing system including a fracturing pump;
    (i) after step "h", formulating the fracturing fluid with the treated aqueous base fluid, and the pump of the fracturing system pumping the fracturing fluid into the wellbore for fracturing operations.

14. The method of claim 13, wherein testing in step "d" is performed downstream of the at least one additive is introduced in step "f" and upstream of the fracturing system.

15. The method of claim 14, wherein the at least one additive includes a bromine biocide, and further comprising the step of testing at least one sample of flowback fluids at the conclusion of the fracturing operations to identify residual traces of the bromine biocide.

16. The method of claim 13, wherein during step "h" the aqueous base fluid is delivered to the fracturing system located proximate to the well site.

17. The method of claim 13, wherein first during step "d" the aqueous base fluid is first delivered to a first set of fracturing fluid tanks located proximate to the source of aqueous base fluid, and second during step "h" delivered to the fracturing system located proximate to the well site.

\* \* \* \* \*